(12) United States Patent
Xu et al.

(10) Patent No.: US 9,374,340 B2
(45) Date of Patent: Jun. 21, 2016

(54) NESTED INDEPENDENT VIRTUAL PRIVATE NETWORKS WITH SHARED REKEY AND CONSISTENCY SERVICES

(71) Applicant: Cisco Technology, Inc., San Jose, CA (US)

(72) Inventors: Hong Xu, Sunnyvale, CA (US); Brian Weis, San Jose, CA (US); Jie Chu, Los Altos, CA (US); Sheela Rowles, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 149 days.

(21) Appl. No.: 14/257,047

(22) Filed: Apr. 21, 2014

(65) Prior Publication Data

US 2015/0304282 A1    Oct. 22, 2015

(51) Int. Cl.
*G06F 21/00* (2013.01)
*H04L 29/06* (2006.01)

(52) U.S. Cl.
CPC .......... *H04L 63/0272* (2013.01); *H04L 63/062* (2013.01)

(58) Field of Classification Search
CPC . H04L 63/0272; H04L 63/061; H04L 63/062; H04L 63/045
See application file for complete search history.

(56) References Cited

U.S. PATENT DOCUMENTS

| | | | |
|---|---|---|---|
| 7,539,311 B2 | 5/2009 | Weis | |
| 7,613,826 B2 | 11/2009 | Guichard et al. | |
| 7,620,975 B2 | 11/2009 | Guichard et al. | |
| 7,724,732 B2 | 5/2010 | Guichard et al. | |
| 7,761,702 B2 | 7/2010 | Weis et al. | |
| 7,827,262 B2 | 11/2010 | Weis | |
| 8,050,408 B2 | 11/2011 | Weis | |
| 8,250,359 B2 | 8/2012 | Weis et al. | |
| 8,347,376 B2 | 1/2013 | Weis et al. | |
| 8,515,079 B1 | 8/2013 | Asati et al. | |
| 2013/0219035 A1* | 8/2013 | Detienne | H04L 9/0833 709/223 |
| 2015/0188943 A1* | 7/2015 | Williams | H04L 63/166 713/151 |

\* cited by examiner

*Primary Examiner* — Fatoumata Traore
*Assistant Examiner* — Kendall Dolly
(74) *Attorney, Agent, or Firm* — Edell, Shapiro & Finnan, LLC

(57) ABSTRACT

First and second nested virtual private networks share a common rekey service. A first key server generates first cryptographic keys and policies for use by gateways of the VPN to encrypt and decrypt data packets. The key server establishes a connection with a second key server to generate second cryptographic keys and policies independently of the first key server for use by encryption units of a second VPN that is nested with and operates independently of the first VPN. The first key server refreshes the first cryptographic keys in the first VPN gateways using a common rekey service, and cooperates with the second key server to refresh the second cryptographic keys in the second VPN encryption units using the common rekey service.

18 Claims, 5 Drawing Sheets

… (1)

NESTED INDEPENDENT VIRTUAL PRIVATE NETWORKS WITH SHARED REKEY AND CONSISTENCY SERVICES

TECHNICAL FIELD

The present disclosure relates to cryptographic key distribution services in virtual private networks (VPNs).

BACKGROUND

Computers in different enterprise networks may communicate with each other over a secure virtual private network (VPN). Key servers associated with the VPN generate and distribute cryptographic keys and policies to network elements in the VPN so that the network elements are able to perform cryptographic operations on network traffic based on the keys and policies. The key servers also periodically refresh the keys and policies in the network elements using a rekey service. The key servers may include a redundant or failover key server that use a consistency service (in addition to the rekey service) to synchronize their keys and polices if a primary key server fails. The rekey and consistency services are examples of key distribution processes or protocols.

To increase security over that provided by a first VPN, a customer may employ a second VPN that performs cryptographic/security operations independently of the first VPN to super-encrypt data packets that traverse both VPNs. Conventionally, the first and second VPNs employ separate, independent first and second rekey services and independent first and second consistency services, respectively.

DESCRIPTION OF EXAMPLE EMBODIMENTS

Overview

In accordance with one embodiment, a method by which multiple Virtual Private Networks (VPNs) share a common rekey service is presented. A first key server is configured to generate first cryptographic keys and policies for use by gateways of a first VPN that is configured to encrypt and decrypt data packets. The first key server establishes a connection with a second key server configured to generate second cryptographic keys and policies independently of the first key server for use by encryption units of a second VPN that is nested with and operates independently of the first VPN. The first key server refreshes the first cryptographic keys in the first VPN gateways using a common rekey service, and cooperates with the second key server to refresh the second cryptographic keys in the second VPN encryption units using the common rekey service.

In accordance with another embodiment, a method by which the multiple VPNs share a common cooperative or consistency service is presented. The first key server synchronizes the first updated cryptographic keys across the first key server and a first failover key server configured to refresh the first updated cryptographic keys in the first VPN gateways if the first key server fails based on a common consistency service. The first key server cooperates with the second key server to synchronize the second updated cryptographic keys across the second key server and a second failover key server configured to refresh the second updated cryptographic keys in the second VPN encryption units if the second key server fails based on the common consistency service.

Example Embodiments

Figure 1:
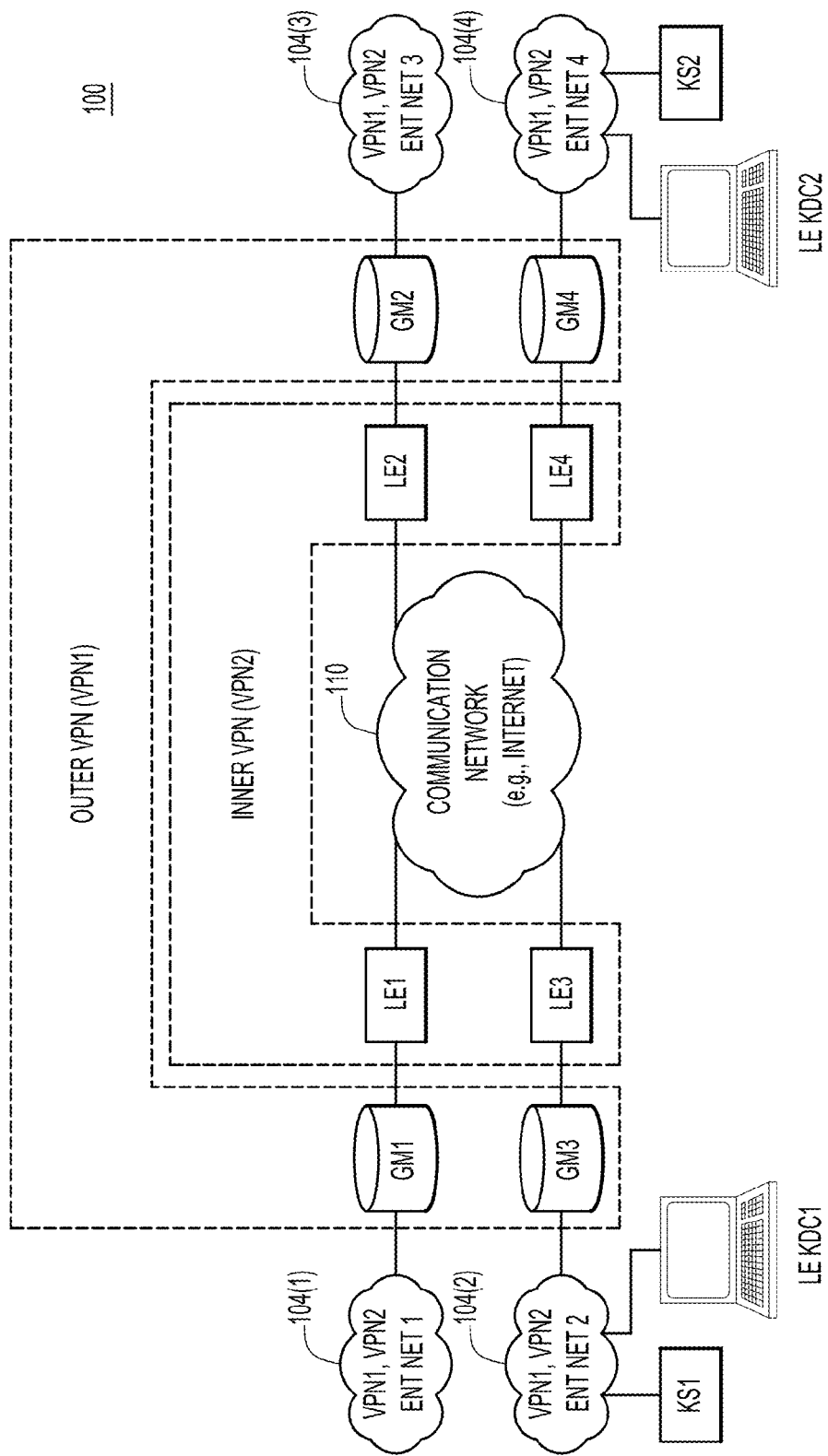
FIG. 1 is shown an example virtual private network (VPN) environment in which multiple independently secured VPNs share common rekey and consistency services according to an example embodiment.

Referring first to FIG. 1, there is shown an example virtual private network (VPN) environment 100 in which multiple VPNs share common rekey and consistency services according to techniques presented herein. VPNs extend private networks across public networks, such as the Internet. VPNs enable computers in enterprise networks associated with the VPNs to send and receive data across shared or public networks as if the computers were directly connected to private networks, while benefiting from the functionality, security and management policies of the private networks.

VPN environment 100 includes multiple enterprise networks EN1-EN4 configured to communicate securely with each other over a communication network 110 using independent nested VPNs VPN1 and VPN2 employed by (or associated with) the enterprise networks. Communication network 110 may include one or more wide area networks (WANs), such as the Internet, and one or more local area networks (LANs). VPN1 includes a group of gateway routers GM1-GM4 that are all group members (GMs) of VPN1 and each of which provides a respective one of enterprise networks EN1-EN4 with VPN gateway access to communication network 110. Similarly, VPN2 includes a group of line encryption (LE) units LE1-LE4 that are all group members of VPN2. Each of line encryption units LE1-LE4 (also referred to herein as "line encryptors") may be a lower-level element of a corresponding higher-level network element, such as a switch or router, associated with VPN2.

VPNs VPN1 and VPN2 are nested VPNs meaning that each gateway GMi (e.g., gateway GM1) is connected "in-line" with a respective companion line encryptor LEi (e.g., LE1) to form an inter-connected gateway-line encryptor pair GMi-LEi (e.g., GM1-LE1) between the respective enterprise network ENi (e.g., EN1) and communication network 110. Thus, data packets flowing between each enterprise network ENi and communication network 110 traverse both gateway GMi and line encryptor LEi in the corresponding in-line gateway-line encryptor pair GMi-LEi. In the embodiment depicted in FIG. 1, each line encryptor LEi is connected between each gateway GMi and network 110 so that the group of line encryptors LE1-LE4 is nested within the group of gateways GM1-GM4 with respect to communication network 110 (i.e., the line encryptors are closer to network 110 than the gateways). Because line encryptors LE1-LE4 of VPN2 are nested within gateways GM1-GM4 of VPN2, VPNs VPN1 and VPN2 are also referred to as outer and inner VPNs, respectively. In an alternative embodiment in which the in-line positions of each gateway GMi and line encryptor LEi are reversed, VPNs VPN1 and VPN2 become inner and outer VPNs, respectively.

VPN1 and VPN2 provide secure communications between enterprise networks EN1-EN4. The nesting of gateways GM1-GM4 and line encryptors LE1-LE4 results in double-encryption or super-encryption of data packets flowing between different ones of enterprise networks EN1-EN4. For example, a data packet flowing from enterprise network EN1 to enterprise network EN3 may be encrypted first at gateway GM1 in accordance with first cryptographic keys and policies associated with VPN1 and then again at line encryptor EN1 in accordance with second cryptographic keys and policies associated with VPN2 and that are different from and independent of the first cryptographic keys and policies. Line encryptor LE1 forwards the double-encrypted packet to network communication 110. Upon exiting communication network 110, the double-encrypted data packet is decrypted first at line encryptor LE2 in accordance with the second cryptographic keys and policies and then again at gateway GM2 before being routed to enterprise network EN3.

In support of the above-mentioned security operations, VPN environment 100 includes first key servers (KSs) KS1 and KS2 associated with VPN1 to generate the first cryptographic keys and policies (also referred to as "key material and security policies" or simply "cryptographic information") used by gateways GM1-GM4 to encrypt and decrypt data packets in VPN1. VPN environment also includes second key serves KDC1 and KDC2 that operate independently of the first key servers to generate the second cryptographic keys and policies (that are different from and independent of the first cryptographic keys and policies) used by line encryptors LE1-LE4 to encrypt and decrypt data packets in VPN2. Key servers KS1, KS2, KDC1, and KDC2 may access VPN1 and VPN2 through any of enterprise networks EN1-EN4 or through any other communication link. In a consistency failover embodiment, key servers KS1 and KDC1 operate respectively as primary key servers to provide the first and second cryptographic information to gateways GM1-GM4 and LE1-LE4 under normal operating conditions, while key servers KS2 and KDC2 operate respectively as redundant or consistency failover key servers that provide the first and second cryptographic information if the counterpart primary key server fails.

First and second keys servers KS1 and KDC1 initially generate first and second initial cryptographic information (i.e., cryptographic keys and policies) and distribute the cryptographic information to gateways GM1-GM4 and line encryptors LE1-LE4. Subsequently, first and second key servers periodically generate new/updated (i.e., refreshed) first and second cryptographic information. First and second key servers KS1 and KDC1 invoke a first key distribution service or protocol referred to as a "rekey service" to distribute the refreshed cryptographic keys and policies to the corresponding gateways and line encryptors. In other words, the rekey service refreshes or updates the cryptographic information in the corresponding gateways or line encryptors. First and second key servers KS1 and KDC1 invoke a second key distribution process or protocol referred to as a "consistency service" (also referred to as a cooperative service) to periodically synchronize the cryptographic information across the primary and failover key servers (i.e., across key servers KS1 and KS2, and across KDC1 and KDC2). The consistency service distributes the refreshed cryptographic information from the primary key server to the corresponding redundant/consistency failover key server so that the failover key server has current cryptographic information that may be used as a starting point from which to perform refresh if the primary key server fails.

In one embodiment, first and second key servers KS1 and KDC1 respectively invoke first and second independently operated rekey services to refresh the first and second cryptographic information in gateways GM1-GM4 and line encryptors LE1-LE2. Similarly, first and second key servers KS1 and KDC1 respectively invoke first and second independently operated consistency services to synchronize the first and second cryptographic information across key servers KS1, KS2 and key servers KDC1, KDC2.

In another embodiment (referred to as a "shared embodiment") described more fully below, a common key service and a common consistency service are shared between VPN1 and VPN2. For example, first and second key servers KS1 and KDC1 share the same/common rekey service to refresh the first and second cryptographic information in gateways GM1-GM4 and line encryptors LE1-LE2. In other words, the same rekey service is used by both of nested VPNs VPN1 and VPN2. Similarly, first and second key servers KS1 and KDC1 share the same consistency service to synchronize the first and second cryptographic information across key servers KS1, KS2 and key servers KDC1, KDC2, respectively. The shared configuration reduces key management (e.g., key distribution services) complexity and the operational burden on the customer as compared to the complexity and burden associated with VPNs that employ separate and independent key distribution services (i.e., four different rekey and consistency services).

In the shared configuration, VPN1 may operate in accordance with Cisco Internetwork Operating System (IOS) Group Encrypted Transport VPN (GETVPN). GETVPN is a tunnel-less VPN technology that provides end-to-end security for network traffic and that preserves the original unencrypted source and destination Internet Protocol (IP) addresses information in the header of the encrypted packet. This form of VPN in which the IP address headers are preserved is also referred to as "transparent VPN." GETVPN uses IP Security (IPsec) for data traffic encryption. GETVPN uses Internet Engineering Task Force (IETF) standard RFC 6407 Group Domain of Interpretation (GDOI) as a key management/distribution protocol. Additionally, the common rekey and common consistency services mentioned above and describe below may operate in accordance with the GDOI protocol as used with GETVPN and extended to apply to nested VPN1 and VPN2. In other embodiments, VPN1 and/or VPN2 may use non-transparent, tunneling techniques, instead of transparent techniques.

Figure 2A:
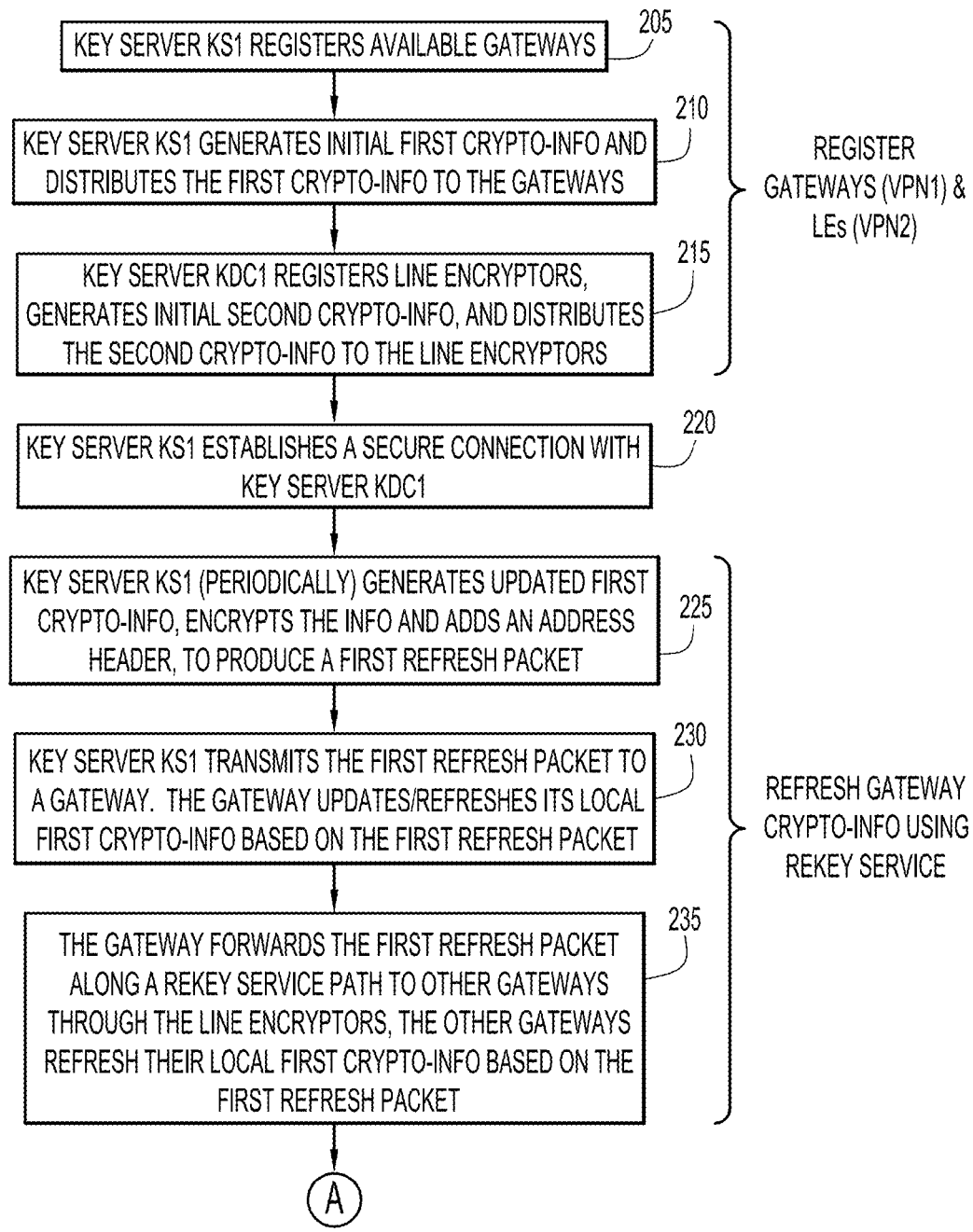
FIGS. 2A and 2B together represent a flowchart of an example method of implementing the common key and consistency services in the VPN environment of FIG. 1, according to an example embodiment.
Figure 2B:
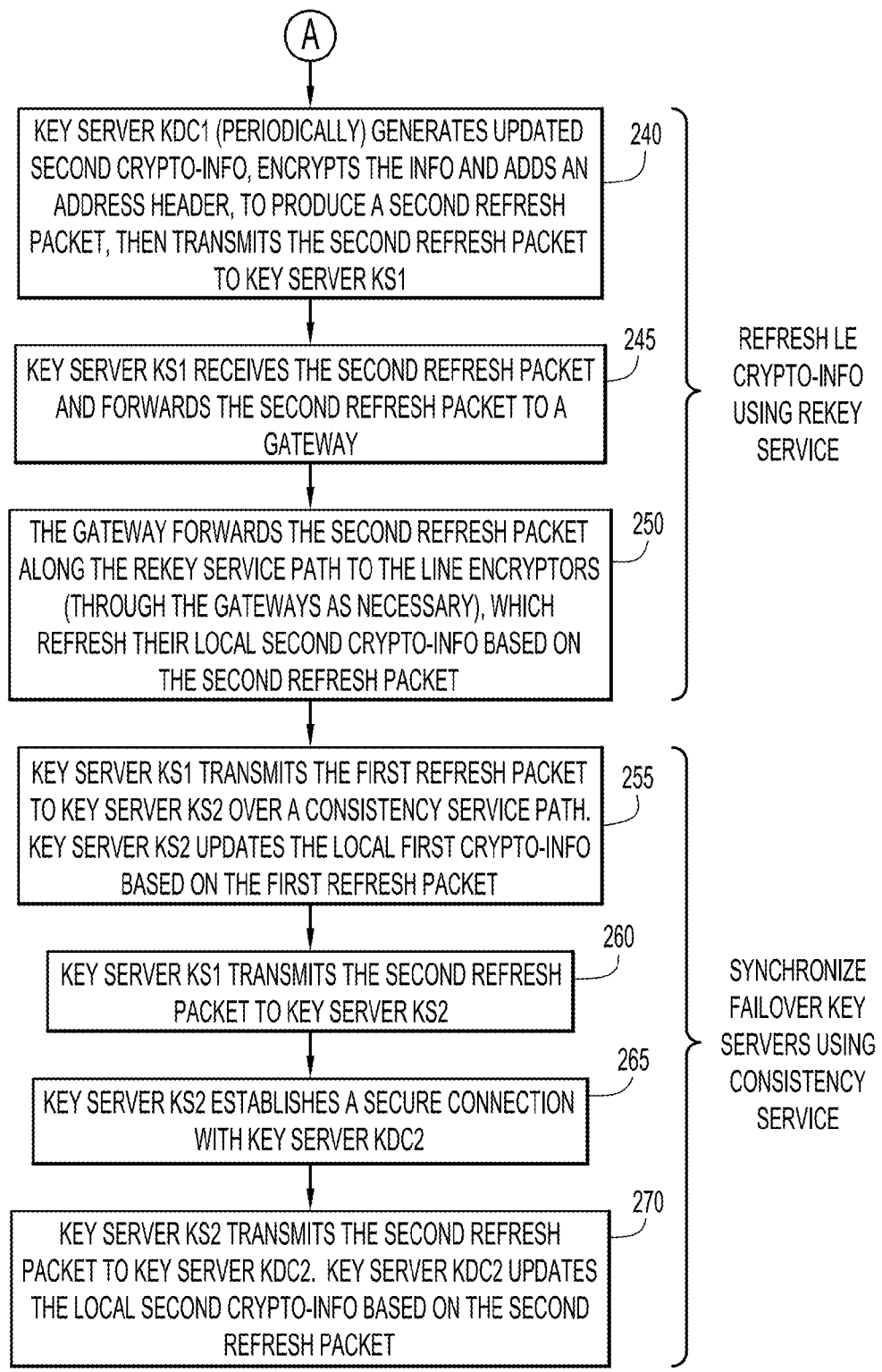
Figure 3:
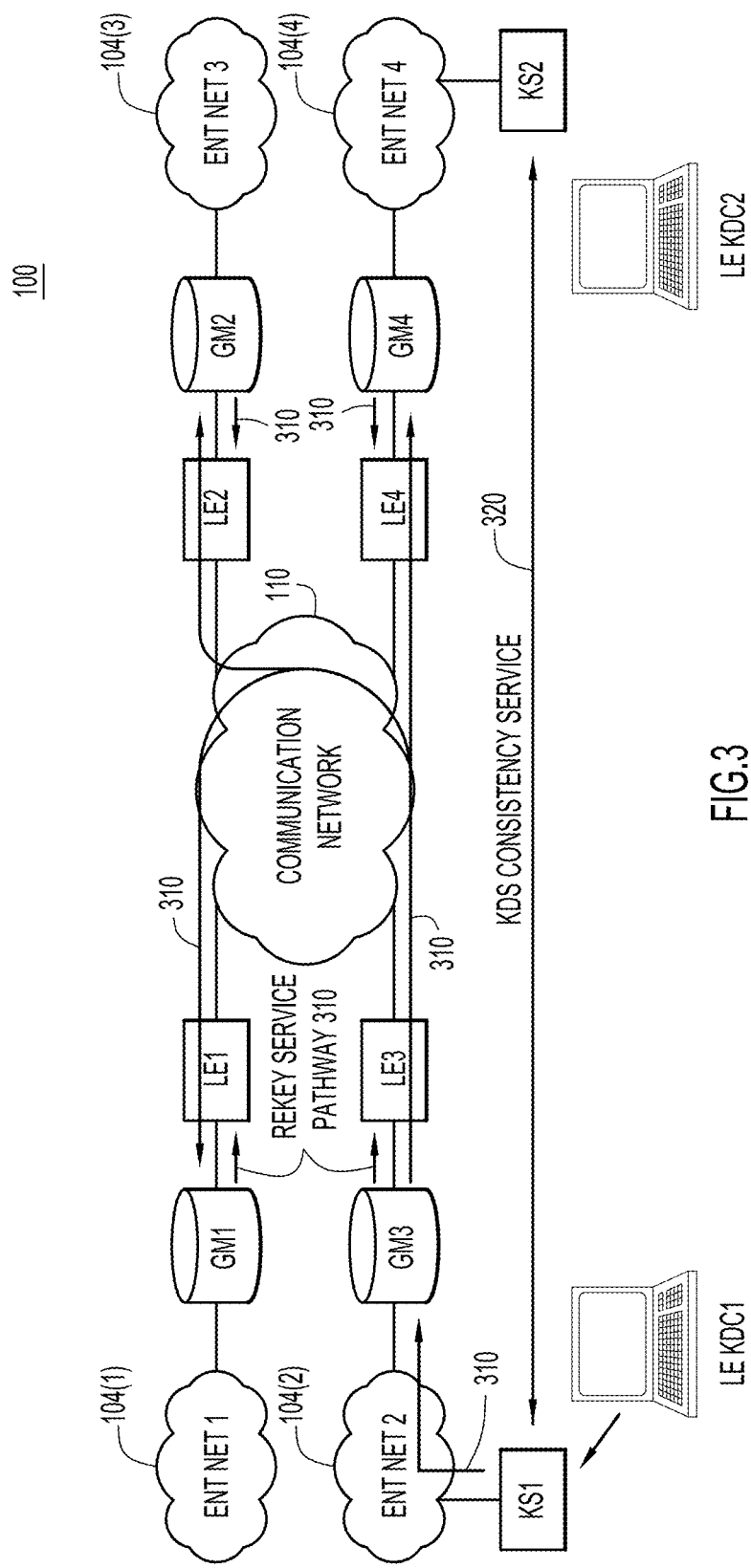
FIG. 3 is an illustration of the VPN environment of FIG. 1 annotated to include rekey and consistency service pathways, according to an example embodiment.

Common key and common consistency services shared between nested VPN1 and VPN2 are now described with reference to FIGS. 2A and 2B, and FIG. 3. FIGS. 2A and 2B are a flowchart of an example method 200 of implementing the common key and common consistency services in VPN environment 100. FIG. 3 is an illustration of VPN environment 100 annotated to include rekey and consistency service pathways described below.

With reference to FIGS. 2A and 2B, at 205, key server KS1 registers all available gateways GM1-GM4 that are group members of VPN1. To do this, each of gateways GM1-GM4 announces its presence/identity to key server KS1 and the key server authenticates the gateway for group membership in VPN1. Assuming successful authentication, key server KS1 enters the authenticated identities of gateways GM1-GM4 into a registration database of the key server.

At 210, key server KS1 generates initial first cryptographic information (i.e., cryptographic keys and policies) and distributes the initial first cryptographic information to each of gateways GM1-GM4 in the form of encrypted data packets that identify, e.g., are addressed to, the registered gateways. The term "cryptographic information" is referred to as "crypto-info" in FIGS. 2A and 2B.

At 215, key server KDC1 registers all available line encryptors LE1-LE4 that are group members of VPN2, generates initial second cryptographic information (i.e., cryptographic keys and policies), and distributes the initial second cryptographic information to each of line encryptors LE1-LE4 in the form of encrypted packets that identify the registered line encryptors.

At 220, key server KS1 establishes a secure connection with key server KDC1.

At 225, key server KS1 (periodically) generates new/updated first cryptographic information. Typically, the updated first cryptographic information includes updated or refreshed cryptographic keys. The updated first cryptographic information may also include updated cryptographic policies from time to time. Key server KS1 encrypts the updated first cryptographic information into an encrypted payload and adds an address header to the payload that identifies (destination) gateways GM1-GM4, to produce a first refresh packet (i.e., a refresh packet including the encrypted updated first cryptographic information and the address header). The address header may be unencrypted in the transparent VPN embodiment or, alternatively, encrypted in the non-transparent VPN embodiment. The term "refresh packet" may be used interchangeably with the term "rekey message."

The common rekey service shared between VPN1 and VPN2 is now described with reference to operations 230-250.

At 230, key server KS1 transmits (i.e., distributes) the first refresh packet to each of gateways GM1-GM4. Key server KS1 may transmit the first refresh packets using either unicast or multicast techniques so that all of the gateways receive respective refresh packets. The gateway, e.g., gateway GM3, recognizes its address in the address header of the first refresh packet, decrypts the first refresh packet to recover the updated first cryptographic information therein, and updates/refreshes (e.g., replaces) the first cryptographic information stored locally in the gateway with the updated first cryptographic information.

At 235, each gateway forwards any refresh packets not intended for that gateway, if any, along a rekey service path 310 (depicted in FIG. 3) through communication network 110 to the other gateways GM4, GM1, and GM2. In other words, one or more refresh packets received by a given gateway may simply traverse that gateway as the refresh packets travel to other gateways. It is to be understood that a particular rekey service path traversed is dependent upon a particular network topology, and the rekey path 310 depicted in FIG. 3 is only one example of many possibilities. For example, it could be that key server KS1 is not "behind" GM3 as depicted in FIG. 3, but is instead connected in the network as a peer to GM3, in which case the refresh packets are delivered to gateway GM3 no differently than to the other gateways.

In traversing rekey service path 310 as depicted in the example of FIG. 3, the first refresh packet transits and is further encrypted/decrypted by line encryptors LE1-LE4 as appropriate. Line encryptors LE1-LE4 each recognize that the first refresh packet is not destined for the line encryptor and therefore forwards the first refresh packet to a next stop on rekey path 210. Each of gateways GM4, GM1, and GM2 that receives the first refresh packet decrypts the packet, and refreshes its locally stored cryptographic information with the first updated cryptographic information recovered from the packet. Thus, key server KS1 distributes the first updated cryptographic information to gateways GM1-GM4 in operations 230 and 235. In other examples, line encryptors LE1-LE4 may not particularly detect the refresh packets are rekey packets (because the line encryptors may expect such packets to be forwarded to the line encryptors from gateways GM1-GM4 using a special communication tunnel setup between the gateways and the line encryptors, as mentioned below in connection with operation 250).

At 240, key server KDC1 (periodically) generates new/updated second cryptographic keys and policies. Typically, the updated second cryptographic information includes updated or refreshed cryptographic keys. The updated second cryptographic information may also include updated cryptographic policies. Key server KDC1 encrypts the updated second cryptographic information into an encrypted payload and adds an address header to the payload that identifies (destination) line encryptors LE1-LE4, to produce a second refresh packet (i.e., a refresh packet including the encrypted updated second cryptographic information and the address header). The address header may be encrypted or, alternatively, unencrypted. Key server KDC1 transmits the second refresh packet to key server KS1 over the secure connection between the two. In another embodiment, key server KDC1 deliver the second refresh packet to key server KS1 using a private communication protocol, specifically indicating that key server KS1 should deliver the second refresh packet using the common rekey service. The identities of line encryptors LE1-LE4 may not be present in the refresh packets if the rekey is intended to be delivered to all of the line encryptors (instead of to selected ones of the line encryptors).

At 245, key server KS1 receives the second refresh packet, recognizes that the second refresh packet is not intended for key server KS1 based on the address header in the second refresh packet, and thus forwards the second refresh packet to gateways GM1-GM4 on behalf of the key server KDC1.

At 250, gateway GM3 receives the second refresh packet, determines that the second refresh packet is not destined for the gateway based on the address header, and thus transmits the second refresh packet to along rekey service path 310 to line encryptors LE1-LE4. Each of line encryptors LE1-LE4 that receives the second refresh packet recognizes that the second refresh packet is destined for the line encryptor based on the address header and therefore decrypts the packet, refreshes its locally stored second cryptographic information with the recovered updated second cryptographic information, and transmits the second refresh packet to a next one of the other line encryptors LE1-LE4. In an embodiment, gateways GM1-GM4 may further encrypt (and decrypt) the second refresh packet as the packet transits each of the gateways, as appropriate. As is seen in operations 245 and 250, key servers KS1 and KDC1 cooperate with each other to distribute the second updated cryptographic information to line encryptors LE1-LE4 using the common rekey service, and thereby refresh the line encryptors. In another embodiment in which the second refresh packet is addressed to gateways GM1-GM4, the gateways and line encryptors LE1-LE4 employ communication tunnels between each other. When a gateway receives a second refresh packet as a payload, the gateway then forwards that packet to the line encryptor over the respective tunnel. This also assumes that the second rekey packet is marked within the common rekey service as being either for the gateway or for the line encryptor.

The common consistency service shared between VPN1 and VPN2 is now described with reference to operations 255-270. It is assumed that key servers KS1 and KDC1 operate as primary key servers and key servers KS2 and KDC2 operate as corresponding redundant/failover key servers in VPN1 and VPN2.

At 255, key server KS1 transmits the first refresh packet to key server KS2 over a consistency service path 320. Consistency path 320 may traverse one or more of enterprise networks EN1-EN4 and communication network 110. Key server KS2 recognizes its address in the address header of the first refresh packet, decrypts the packet, and updates the first cryptographic information stored locally in key server KS2 with the updated first cryptographic information recovered from the first refresh packet. This operation synchronizes the cryptographic information in key servers KS1 and KS2.

At 260, key server KS1 transmits the second refresh packet to key server KS2 on behalf of key server KDC1. Key server KS2 recognizes that the second refresh packet is not destined for key server KS2 based on the type of refresh information in the second refresh packet.

At 265, key server KS2 establishes a secure connection with key server KDC2, if such a connection has not already been established.

At 270, key server KS2 transmits the second refresh packet to key server KDC2 over the secure connection between the two. Key server KDC2 receives the second refresh packet, recognizes its address in the address header of the second refresh packet, decrypts the packet, and updates the second cryptographic information stored locally in key server KDC2 with the updated second cryptographic information recovered from the second refresh packet. This operation synchronizes the cryptographic information in key servers KDC1 and KDC2. As is seen in operations 260-270, key servers KS1, KS2, KDC1, and KDC2 cooperate with each other to synchronize key servers KDC1 and KDC2 using the common consistency service.

Figure 4:
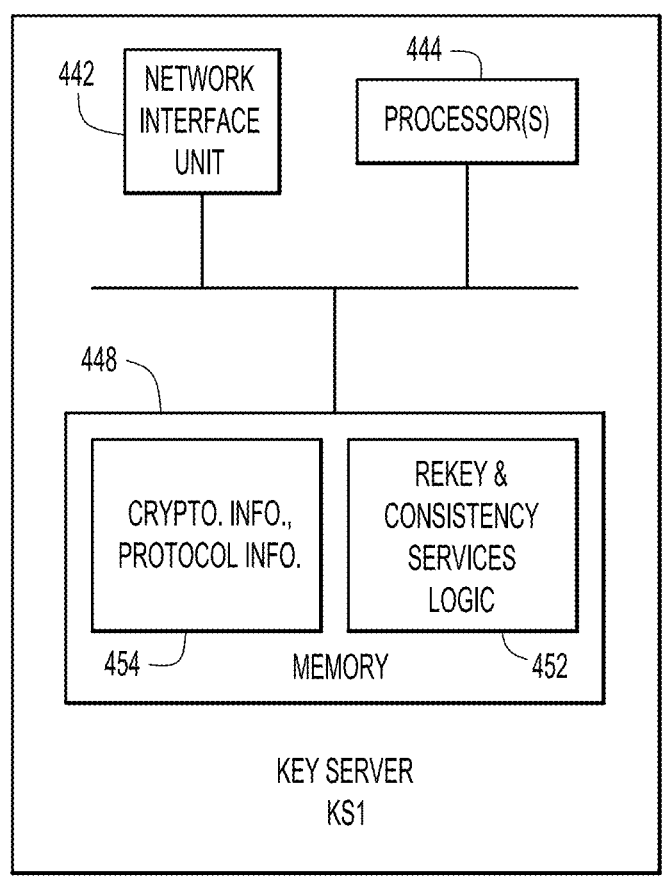
FIG. 4 is an example block diagram of a key server configured to perform common rekey and consistency services across nested first and second VPNs, according to an example embodiment.

Reference is now made to FIG. 4, which shows an example block diagram of key server KS1 (and key server KS2) configured to perform the operations described herein, including operations to implement common rekey and common consistency services across nested VPN1 and VPN2. There are numerous possible configurations for the key server and FIG. 4 is meant to be an example. Key server KS1 includes a network interface (I/F) unit 442, a processor 444, and a memory 448. The network I/F unit 442 is, for example, an Ethernet card device that allows key server KS1 to communicate over a network, e.g., a wired (Ethernet) network. Network I/F 242 may also include wireless connection capability. Processor 444 is a microcontroller or microprocessor, for example, configured to execute software instructions stored in the memory 448.

Memory 448 may comprise read only memory (ROM), random access memory (RAM), magnetic disk storage media devices, optical storage media devices, flash memory devices, electrical, optical, or other physical/tangible (e.g., non-transitory) memory storage devices. Thus, in general, memory 448 may comprise one or more computer readable storage media (e.g., a memory device) encoded with software comprising computer executable instructions and when the software is executed (by processor 444) it is operable to perform the operations described herein. For example, memory 448 stores or is encoded with instructions for Rekey and Consistency Services logic 452 to perform rekey and consistency service operations mentioned above. In addition, memory 448 includes a database 454 that stores cryptographic keys and policies, as well as rekey and consistency services protocol information, such as message definitions, timers, group member addresses, and so on.

In summary, in one form, a method is provided comprising: at a first key server configured to generate first cryptographic keys and policies for use by gateways of a first Virtual Private Network (VPN) that are configured to encrypt and decrypt data packets: establishing a connection with a second key server configured to generate second cryptographic keys and policies independently of the first key server for use by encryption units of a second VPN that is nested with and operates independently of the first VPN; refreshing the first cryptographic keys in the first VPN gateways using a common rekey service; and refreshing the second cryptographic keys in the second VPN encryption units in cooperation with the second key server using the common rekey service.

In summary, in another form, an apparatus is provided comprising: a network interface unit configured to transmit and receive communications over a network on behalf of a first key server; and a processor coupled to the network interface unit, and configured to: generate first cryptographic keys and policies for use by gateways of a first Virtual Private Network (VPN) that are configured to encrypt and decrypt data packets; establish a connection with a second key server configured to generate second cryptographic keys and policies independently of the first key server for use by encryption units of a second VPN that is nested with and operates independently of the first VPN; refresh the first cryptographic keys in the first VPN gateways using a common rekey service; and refresh the second cryptographic keys in the second VPN encryption units in cooperation with the second key server using the common rekey service.

In summary, in yet another form, a processor readable medium is provided. The processor readable medium stores instructions that, when executed by a processor, cause the processor to: generate at a first key server first cryptographic keys and policies for use by gateways of a first Virtual Private Network (VPN) to encrypt and decrypt data packets; establish a connection with a second key server configured to generate second cryptographic keys and policies independently of the first key server for use by encryption units of a second VPN that is nested with and operates independently of the first VPN; refresh the first cryptographic keys in the first VPN gateways using a common rekey service; and refresh the second cryptographic keys in the second VPN encryption units in cooperation with the second key server using the common rekey service.

Although the method, apparatus, and computer program product are illustrated and described herein as embodied in one or more specific examples, it is nevertheless not intended to be limited to the details shown, since various modifications and structural changes may be made therein without departing from the scope of the method, apparatus, and computer program product and within the scope and range of equivalents of the claims. Accordingly, it is appropriate that the appended claims be construed broadly and in a manner consistent with the scope of the method, apparatus, and computer program product, as set forth in the following claims.

What is claimed is:

1. A method of using a common rekey service shared between nested Virtual Private Networks (VPNs) to simplify cryptographic key management, comprising:
   at a first key server configured to generate first cryptographic keys and policies for gateways of a first VPN that are configured to encrypt and decrypt data packets based on the first cryptographic keys and policies:
   establishing a connection with a second key server configured to generate second cryptographic keys and policies independently of the first key server for encryption units of a second VPN that is nested with and operates independently of the first VPN, wherein the encryption units are configured to encrypt and decrypt data packets based on the second cryptographic keys and polices;

refreshing the first cryptographic keys in the first VPN gateways by generating updated first cryptographic keys and distributing, via at least one of the second VPN encryption units, the updated first cryptographic keys to the first VPN gateways using the common rekey service; and refreshing the second cryptographic keys in the second VPN encryption units by receiving updated second cryptographic keys from the second key server and distributing, via at least one of the first VPN gateways, the updated second cryptographic keys to the second VPN encryption units using the common rekey service.

2. The method of claim 1, further comprising, at the first key server:
generating updated first cryptographic policies;
distributing the updated first cryptographic policies to the first VPN gateways based on the common rekey service;
receiving encrypted, updated second cryptographic policies from the second key server; and
distributing via the first VPN gateways the updated second cryptographic policies to the second VPN encryption units based on the common rekey service.

3. The method of claim 1, wherein the receiving includes receiving updated second cryptographic keys encrypted in accordance with the second cryptographic keys and policies.

4. The method of claim 1, wherein the common rekey service operates in accordance with the Internet Engineering Task Force (IETF) standard RFC 6407 Group Domain of Interpretation (GDOI).

5. The method of claim 1, wherein the distributing updated first cryptographic keys includes unicasting or multicasting the updated first cryptographic keys based on the common rekey service and distributing the updated second cryptographic keys includes unicasting and multicasting the updated first cryptographic keys based on the common rekey service.

6. The method of claim 1, further comprising, at the first key server, registering each of the first VPN gateways independently of the second VPN encryption units and performing the updating, the distributing the updated first cryptographic keys, and the distributing the updated second cryptographic keys after the registering.

7. A method of using common key management services shared between nested Virtual Private Networks (VPNs) to simplify cryptographic key management, comprising:
at a first key server configured to generate first cryptographic keys and policies for gateways of a first VPN that are configured to encrypt and decrypt data packets based on the first cryptographic keys and policies:
establishing a connection with a second key server configured to generate second cryptographic keys and policies independently of the first key server for encryption units of a second VPN that is nested with and operates independently of the first VPN, wherein the encryption units are configured to encrypt and decrypt data packets based on the second cryptographic keys and policies;
refreshing the first cryptographic keys in the first VPN gateways using a common rekey service;
refreshing the second cryptographic keys in the second VPN encryption units in cooperation with the second key server using the common rekey service;
synchronizing the first updated cryptographic keys across the first key server and a first failover key server configured to refresh the first updated cryptographic keys in the first VPN gateways if the first key server fails based on a common consistency service; and
synchronizing the second updated cryptographic keys across the second key server and a second failover key server configured to refresh the second updated cryptographic keys in the second VPN encryption units if the second key server fails based on the common consistency service.

8. The method of claim 7, wherein the synchronizing the second updated cryptographic keys includes transmitting the updated second cryptographic keys to the second failover key server via the first consistency failover key server.

9. An apparatus configured to facilitate using a common rekey service shared between nested Virtual Private Networks (VPNs) to simplify cryptographic key management, comprising:
a network interface unit configured to transmit and receive communications over a network on behalf of a first key server; and
a processor coupled to the network interface unit, and configured to:
generate first cryptographic keys and policies for gateways of a first VPN that are configured to encrypt and decrypt data packets based on the first cryptographic keys and policies;
establish a connection with a second key server configured to generate second cryptographic keys and policies independently of the first key server for encryption units of a second VPN that is nested with and operates independently of the first VPN, wherein the encryption units are configured to encrypt and decrypt data packets based on the second cryptographic keys and polices;
refresh the first cryptographic keys in the first VPN gateways by generating updated first cryptographic keys and distributing, via at least one of the second VPN encryption units, the updated first cryptographic keys to the first VPN gateways using the common rekey service; and
refresh the second cryptographic keys in the second VPN encryption units by receiving updated second cryptographic keys from the second key server and distributing, via at least one of the first VPN gateways, the updated second cryptographic keys to the second VPN encryption units using the common rekey service.

10. The apparatus of claim 9, wherein the processor is further configured to:
generate updated first cryptographic policies;
distribute the updated first cryptographic policies to the first VPN gateways based on the common rekey service;
obtain encrypted, updated second cryptographic policies received from the second key server; and
distribute via the gateways the updated second cryptographic policies to the second VPN encryption units based on the common rekey service.

11. The apparatus of claim 9, wherein the processor is configured to distribute the updated first cryptographic keys by unicasting and multicasting the updated first cryptographic keys based on the common rekey service and distribute the updated second cryptographic keys by unicasting and multicasting the updated first cryptographic keys based on the common rekey service.

12. The apparatus of claim 9, wherein the processor is further configured to:
synchronize the first updated cryptographic keys across the first key server and a first failover key server configured to refresh the first updated cryptographic keys in the first VPN gateways if the first key server fails based on a common consistency service; and synchronize the second updated cryptographic keys across the second key server and a second failover key server configured to refresh the second updated cryptographic keys in the second VPN encryption units if the second key server fails based on the common consistency service.

13. The apparatus of claim 12, wherein the processor is configured to synchronize the second updated cryptographic keys by transmitting the updated second cryptographic keys to the second failover key server via the first failover key server.

14. A non-transitory processor readable medium storing instructions that, when executed by a processor, cause the processor to use a common rekey service shared between nested Virtual Private Networks (VPNs) to simplify cryptographic key management, wherein the instructions are configured to cause the processor to:

generate at a first key server first cryptographic keys and policies for gateways of a first VPN to encrypt and decrypt data packets based on the first cryptographic keys and polices;

establish a connection with a second key server configured to generate second cryptographic keys and policies independently of the first key server for encryption units of a second VPN that is nested with and operates independently of the first VPN, wherein the encryption units are configured to encrypt and decrypt data packets based on the second cryptographic keys and polices;

refresh the first cryptographic keys in the first VPN gateways by generating updated first cryptographic keys and distributing, via at least one of the second VPN encryption units, the updated first cryptographic keys to the first VPN gateways using the common rekey service; and refresh the second cryptographic keys in the second VPN encryption units by receiving updated second cryptographic keys from the second key server and distributing, via at least one of the first VPN gateways, the updated second cryptographic keys to the second VPN encryption units using the common rekey service.

15. The processor readable medium of claim 14, further including instructions to cause the processor to:

generate updated first cryptographic policies;

distribute the updated first cryptographic policies to the first VPN gateways based on the common rekey service;

obtain encrypted, updated second cryptographic policies received from the second key server; and distribute via the gateways the updated second cryptographic policies to the second VPN encryption units based on the common rekey service.

16. The processor readable medium of claim 14, further including instructions to cause the processor to distribute the updated first cryptographic keys by unicasting or multicasting the updated first cryptographic keys based on the common rekey service and distribute the updated second cryptographic keys by unicasting and multicasting the updated first cryptographic keys based on the common rekey service.

17. The processor readable medium of claim 14, further including instructions to cause the processor to:

synchronize the first updated cryptographic keys across the first key server and a first failover key server configured to refresh the first updated cryptographic keys in the first VPN gateways if the first key server fails based on a common consistency service; and synchronize the second updated cryptographic keys across the second key server and a second failover key server configured to refresh the second updated cryptographic keys in the second VPN encryption units if the second key server fails based on the common consistency service.

18. The processor readable medium of claim 17, further including instructions to cause the processor to synchronize the second updated cryptographic keys by transmitting the updated second cryptographic keys to the second failover key server via the first failover key server.

* * * * *